United States Patent [19]

Valdes et al.

[11] Patent Number: 5,068,803

[45] Date of Patent: Nov. 26, 1991

[54] METHOD AND APPARATUS FOR FILLING CONTOURS IN DIGITAL TYPEFACES

[75] Inventors: Jacobo Valdes; Eduardo Martinez, both of Palo Alto, Calif.

[73] Assignee: Sun Microsystems, Inc., Mountain View, Calif.

[21] Appl. No.: 407,911

[22] Filed: Sep. 15, 1989

[51] Int. Cl.[5] .................... G06F 3/14

[52] U.S. Cl. .................... 395/150; 340/735; 340/748

[58] Field of Search .................... 364/518, 523; 340/735, 340/748

[56] References Cited

U.S. PATENT DOCUMENTS

| | | | |
|---|---|---|---|
| 4,675,830 | 6/1987 | Hawkins | 364/518 |
| 4,675,833 | 6/1987 | Cheek et al. | 364/518 |
| 4,907,282 | 3/1990 | Daly et al. | 364/518 |
| 4,959,801 | 9/1990 | Apley et al. | 364/518 |

*Primary Examiner*—David L. Clark

*Attorney, Agent, or Firm*—Blakely, Sokoloff, Taylor & Zafman

[57] ABSTRACT

A method and apparatus is described which fills in the pixels missed when drop-out occurs during the fill process of character contours. The character contour is decomposed into a series of rook moves. The pixel selected is the one more covered by the actual shape of the portion of the curve where the rook moves are coincident and dropout occurs. This is dependent upon the slope of each of the curves at the location of drop-out. Preferably the length of the sequence of colinear consecutive rook moves is used to approximate the slopes of the curves. The target pixel of the longest sequence of colinear rook moves is more covered than its opposite pixel and therefore the target pixel is set. The target pixel for a rook move is the pixel in the winding direction (i.e., left or right direction) along the rook move. Thus the target pixel of the stronger rook moves will be set and added to the bit map image generated using a outline fill process. In the preferred embodiment, the rook moves are examined to determine the length of a sequence, that is the number of rook moves that are sequentially in alignment with one another. A strength value is then assigned to each of those rook moves in a sequence equal to the number of rook moves in the sequence. The strength value of the rook move is then compared to the strength value of the opposite pixel, that is the pixel opposite the target pixel for a particular rook move. If the strength value of the target pixel of the rook move is greater than the strength of the opposite pixel, the opposite pixel value if reset to zero and the target pixel is set to equal the strength of the sequence. This process is performed for each rook move in a sequence and for each sequence of rook moves around the contour of the character. Once all rook moves have been evaluated, the value is assigned to the pixels of the character according to this process, are adjusted to reflect a bit map image to be displayed. This is achieved by turning on all bits which are greater than zero. The bit map generated is then logically ORed with the bit map generated using the contour fill process to provide a filled character in which drop out is eliminated and the distortion to the character is minimized.

18 Claims, 5 Drawing Sheets

METHOD AND APPARATUS FOR FILLING CONTOURS IN DIGITAL TYPEFACES

BACKGROUND OF THE INVENTION

1. FIELD OF THE INVENTION

The method and apparatus of the present invention is directed to the filling of contours. More specifically, the method and apparatus of the present invention is directed to the filling of the contours representative of characters in a digital typeface.

2. ART BACKGROUND

The art of digital typography is applied to the representation of characters of a typeface in digital form. Typically computers are used to design, prepare and present the typefaces used in documents and the like. One method to represent the characters of digital typefaces is by representing each character by its contour. When the character is subsequently generated for display or for printing purposes, the contour is filled in order to provide a solid representation of the character.

The contours themselves may be represented by segments, a plurality of segments connected together representing the contour or curves and segments. Straight line segments, arcs of circles as well as splines are used to represent the shapes of curves. To approximate a particular contour it is necessary to break the curve into segments that meet at their end points. Each segment may then be specified by a straight line, curve or spline and these segments are connected together to form the contour of the character.

When a character is to be output to a display device, such as a computer monitor or a printing device, the contours are filled in using a filling technique. For example, those pixels within the contour would be filled, that is turned on, and those outside of the contour would not be turned on. However, this technique does not address the problem of having a contour within a contour such as the situation found with the letter "o" which has an external rounded contour and an internal rounded contour which is smaller than the external contour. Visually it is desirable that the area within the inner contour not be filled or turned on and the pixels within the area between the outer contour and the inner contour be turned on. Thus a more sophisticated technique is needed in order to fill the character contours.

In one method to fill character contours, the contour is translated into or broken down into a series of "rook" moves. Rook moves are single unit moves along either the x or y axis. This is illustrated by FIGS. 1*a* and 1*b* which show the outline of the letter "P" and the outline broken down to a series of rook moves. Once the character is represented by rook moves the outline is filled in scan line by scan line. For example referring to FIG. 1*b*, this is achieved by starting at the top left hand corner 10 of the character and moving from the left side to the right side scan line by scan line (i.e. horizontally). The status of the fill will be in an off mode initially and will change to the on mode, wherein the pixels are turned on, when the pointer crosses a rook move. Thus, in the first scan line at the first rook move crossed 15, the subsequent pixels 20, 25, 30, 35 will be turned on when the next rook move 40 is reached, the mode reverts to off whereby subsequent pixels are not turned on. Thus, when the pointer crosses a first rook move the pixel mode is "on" whereby successive pixels are turned on and when it crosses a subsequent rook move the pixel mode toggles off whereby subsequent pixels are not turned on, the result is that those pixels within the contour are turned on and those pixels which are external to the contour are off.

If the pointer is at the scan line which crosses a center portion of a character, for example, scan line 45 in FIG. 1*b*, the pointer will proceed from the left side of the character to the right crossing a first rook move 50 thereby turning the subsequent pixels on until it crosses a the next rook move 55 whereby the subsequent pixels are off. The pixels following rook move 60 are turned on until rook move 65 is reached whereby subsequent pixels are not turned on (these pixels in the off state represent those pixels within the inner contour). The pointer will then cross rook move 70, whereby the subsequent pixels are turned on and finally rook move 75 reflective of the outer contour of the character whereby the subsequent pixels are kept in the off state.

Problems arise when the contour lines or the spacing between the contour lines is small and/or when the size of the pixel being displayed is too coarse in relation to the size of the character being displayed. In these cases, rook moves representative of two contour lines spaced closely together will occur at the same location. This is illustrated in FIG. 1*b* wherein rook moves 80 and 85 are coincident. Using the above described fill algorithm, the pointer will cross rook move 80 as well as rook move 85 at the same location. Therefore, a double change of pixel status from off to on and on to off takes place. The result is that parts of the character are not shown and the character appears in disjointed segments. This problem is referred to by those in the art as "drop out". The problem of drop out is best illustrated by referring to the characters illustrated in FIG. 2 which was filled in using the above described fill process. Drop out occurred in several places along the contour identified by the letters a, b, c and d. At point a, dropout occurred because two rook moves occurred at the same location whereby the state of the fill process is turned on and off at the same location. At b, c and d, the rook moves determined run parallel, as opposed to perpendicular, to the scan line such that a rook move is not "crossed" at the location to turn the subsequent pixels on.

In order to minimize the problem of drop out additional steps are taken to further fill in the contour. This is achieved by filling in predetermined pixels along the contour. For example in one method used, each pixel to the right and below a particular grid point on which a rook move lies is filled in. This solves the problem of drop out because it insures that pixels are painted along the entire contour. However, the dropout was eliminated at the cost of distorting the character. More particularly, the resulting character is higher as well as thicker, thus making it visually bolder than the original character. This is not a desirable feature and makes the characters hard to visualize and recognize.

In another technique, the rook moves are classified according to its direction: North, South, East and West. Drop out occurs when a North and South moves are coincident or when an East and West moves are coincident. One move direction is selected from the group East and West and the group North and South. Thus, for example, if the North and East directions are selected, whenever a rook move is in the North or East direction the corresponding pixel is turned on and added to the pixels turned on by the fill process. This technique attempts to limit the increase in thickness and height of the character by turning a pixel on with respect to only one of the coincident rook moves. However, this technique results in an asymmetrical addition of pixels which also distorts the features of the character.

SUMMARY OF THE INVENTION

It is therefore an object of the present invention to provide a way to eliminate drop out.

It is further an object of the present invention to provide a method and apparatus for the elimination of drop out wherein the distortion to the character is minimized.

In the method and apparatus of the present invention a contour is decomposed into a series of rook moves. A single pixel is set ("turned on") at those pixel locations where coincident opposite rook moves, and thus drop out, occur. The pixel selected is the one more covered by the actual shape of the portion of the curve where the rook moves are coincident and dropout occurs. This is dependent upon the slope of each of the curves at the location where the rook moves are coincident. Preferably, the length of the sequence of colinear consecutive rook moves is used to approximate the slopes of the respective curves in the area of dropout. The rook moves are analyzed according to the number of consecutive colinear rook moves to determine a target pixel is to be set. A target pixel is the pixel in the winding direction (i.e., right or left direction) as you move along the rook move. The target pixel on the longest sequence of colinear rook moves is more covered than its opposite pixel. Therefore the target pixel would be set and added to the bit map image generated using a outline fill process.

More particularly, the rook moves are examined to determine the length of a sequence, that is the number of rook moves that are sequentially in alignment with one another. A strength value is then assigned to each of those rook moves in a sequence equal to the number of rook moves in the sequence. The strength value of the rook move is then compared to the strength value of the opposite pixel, that is the pixel opposite the target pixel for a particular rook move. If the strength value of the target pixel of the rook move is greater than the strength of the opposite pixel, the opposite pixel value is reset to zero and the target pixel is set to equal the strength of the sequence. This process is performed for each rook move in a sequence and for each sequence of rook moves around the contour of the character. Once all rook moves have been evaluated, the value is assigned to the pixels of the character according to this process, are adjusted to reflect a bit map image to be displayed. This is achieved by turning on all bits which are greater than zero. The bit map generated is then logically ORed with the bit map generated using the contour fill process to provide a filled character in which drop out is eliminated and the distortion to the character is minimized.

BRIEF DESCRIPTION OF THE DRAWINGS

The objects, features and advantages of the method and apparatus of the present invention, will be apparent from the following detailed description in which.

NOTATION AND NOMENCLATURE

Figure 1A:
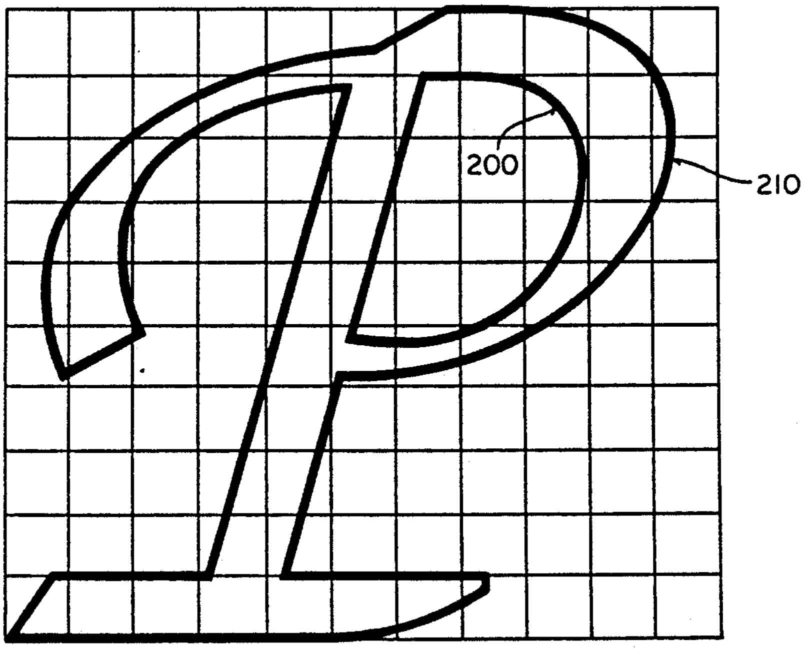
FIGS. 1*a* and 1*b* illustrates the outline and corresponding rook moves of the letter "P".

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given below.

DETAILED DESCRIPTION OF THE INVENTION

In the following description, numerous specific details are set forth such as algorithmic conventions, character definition conventions, specific numbers of bits, etc., in order to provide a thorough understanding of the present invention. However, it will be obvious to one skilled in the art that the present invention may be practiced without these specific details. In other instances, well-known circuits and structures are not described in detail in order not to obscure the present invention unnecessarily.

GENERAL SYSTEM CONFIGURATION

Figure 3:
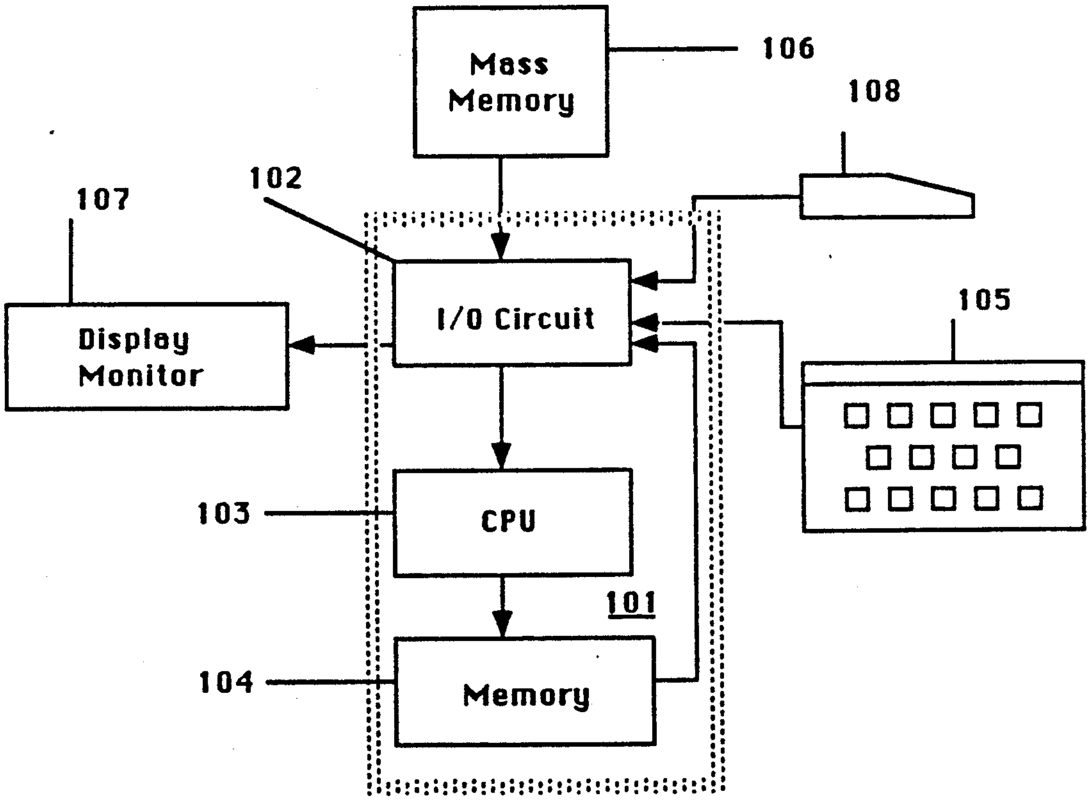
FIG. 3 is a block diagram of an exemplary computer system utilizing the present invention.

FIG. 3 shows a typical computer-based system for filling contours according to the present invention. Shown there is a computer 101 which comprises three major components. The first of these is the input/output (I/O) circuit 102 which is used to communicate information in appropriately structured form to and from the other parts of the computer 101. Also shown as a part of computer 101 is the central processing unit (CPU) 103 and memory 104. These latter two elements are those typically found in most general purpose computers and almost all special purpose computers. In fact, the several elements contained within computer 101 are intended to be representative of this broad category of data processors. Particular examples of suitable data processors to fill the role of computer 101 include machines manufactured by Sun Microsystems, Inc., Mountain View, Calif. Other computers having like capabilities may of course be adapted in a straightforward manner to perform the functions described below.

Also shown in FIG. 3 is an input device 105, shown in typical embodiment as a keyboard. It should be understood, however, that the input device may actually be a card reader, magnetic or paper tape reader, or other well-known input device (including, of course, another computer). A mass memory device 106 is coupled to the I/O circuit 102 and provides additional storage capability for the computer 101. The mass memory may include other programs and the like and may take the form of a magnetic or paper tape reader or other well known device. It will be appreciated that the data retained within mass memory 106, may, in appropriate cases, be incorporated in standard fashion into computer 101 as part of memory 104.

In addition, a display monitor 107 is illustrated which is used to display messages or other communications to the user. Such a display monitor may take the form of any of several well-known varieties of CRT displays. Preferably, the display monitor 107 may also display the graphic images i.e. the characters, generated from the digital typeface data generated according to the process of the present invention. A cursor control 108 is used to select command modes and edit the input data, such as, for example, the scale of the typeface, and provides a more convenient means to input information into the system.

PROCESS OVERVIEW

Figure 1B:
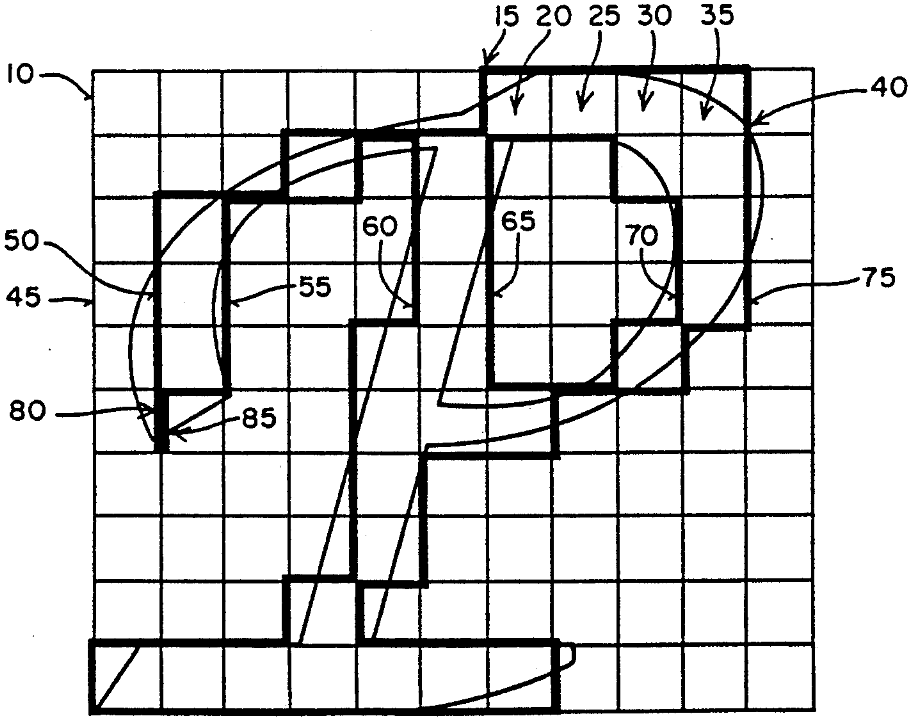

A character may be described in terms of a contour as illustrated in FIG. 1. FIG. 1*a* shows the inner contour 200 and outer contour 210 of the letter "P". The inner and outer contours 200, 210 are then broken down into a series of rook moves. A rook move is a horizontal or vertical move between consecutive grid points. The totality of rook moves for a contour represents a discreet representation of the character. The character "P" illustrated in FIG. 1*a* is represented by a plurality of rook moves as illustrated in FIG. 1*b*. The contour represented by rook moves is then examined rook move by rook move to determine what additional pixels should be set in order to eliminate the problem of drop out. The pixel selected is the one more covered by the actual shape of the portion of the curve where dropout occurs. This is dependent upon the slope of each of the curves. Preferably the length of the sequence of colinear consecutive rook moves is used to approximate the slopes of the respective curves in the area of dropout. The pixels to be added are determined by detecting coincident rook moves and adding a single pixel for every coincident pair according to the length of a sequence of colinear rook moves. The target pixel of the longest sequence of colinear rook moves is more covered than its opposite pixel. Therefore, the target pixel is set. Thus, in the situation of coincident rook moves, only the pixel corresponding to stronger rook move is added eliminating the addition of two pixels and the resulting distortion of the character.

The sequence of evaluation of the rook moves is determined according to the sequence of rook moves in the direction of the contour. In addition, the characters comprising multiple contours, such as the character "P" illustrated in FIGS. 1*a* and 1*b*, are evaluated contour by contour. Thus, with respect to the letter "P", the inner contour (200, FIG. 1*a*) may be evaluated first followed by the outer contour (210, FIG. 1*a*) or vice versa.

Figure 4:
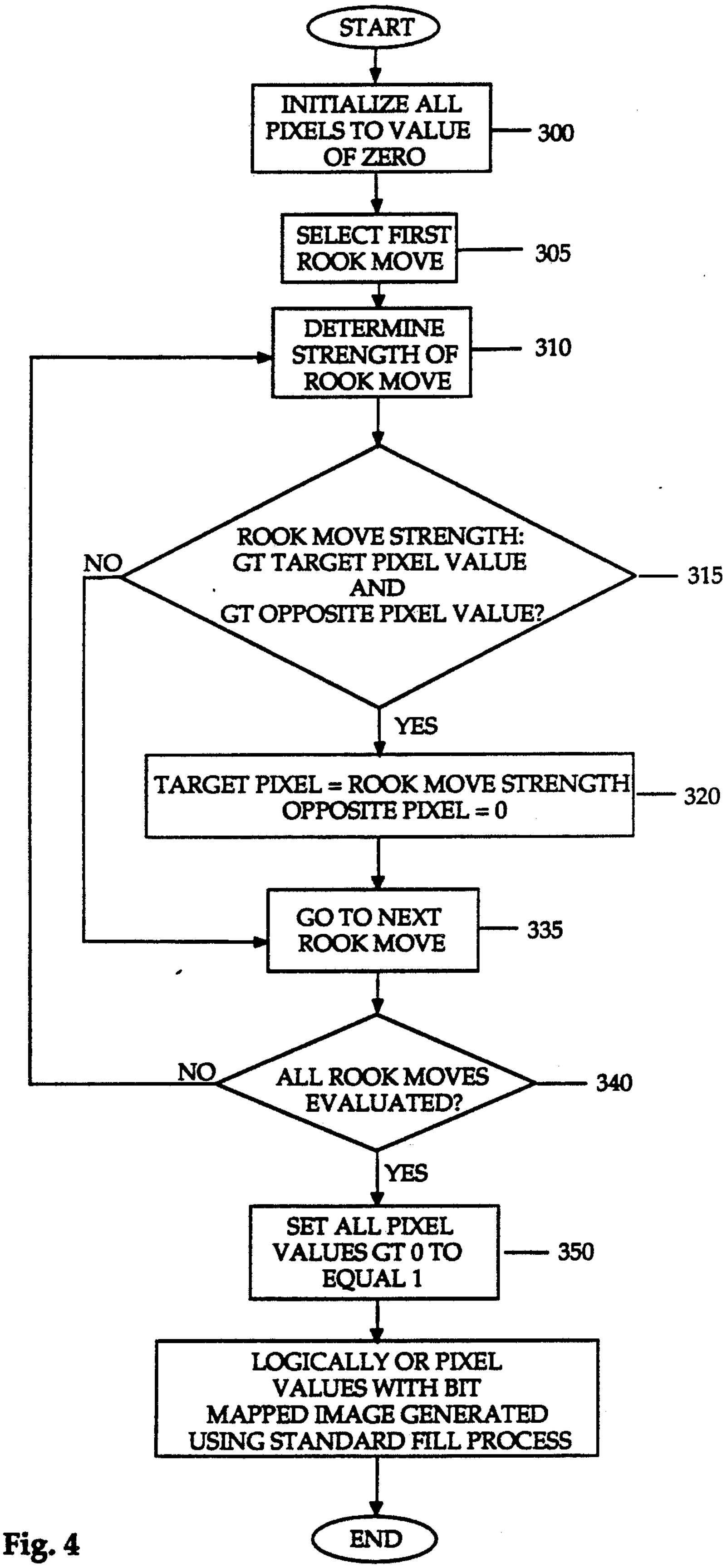
FIG. 4 is a flow chart representing a preferred embodiment of the present invention.
Figure 6:
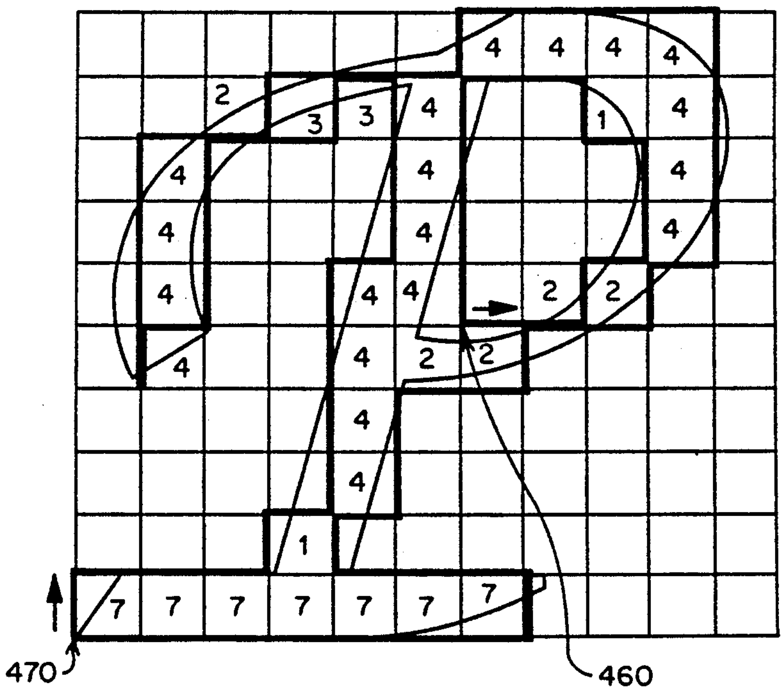
FIG. 6 illustrates the implementation of the preferred embodiment of the present invention with respect to the letter "P".

A preferred embodiment of the present invention is represented by the flow chart of FIG. 4. Initially, at block 300, all the pixels of the bit map are initialized to a value of zero. At block 305 a first rook move in the contour is selected. The first rook move may be arbitrarily picked or picked according to a predetermined algorithm. For example, the first rook move may be the bottom left corner of the contour. In the present example the start points are the bottom left corner of each of the contours. This is illustrated in FIG. 6 where the start point for the outer contour is at 470 and the start point for the inner contour is at 460.

At block 310, the strength of the rook move is determined. The strength of the rook move is equal to the total number of rook moves that are in a colinear sequence, that is, the number of rook moves that are in alignment with one another without changing direction through a 90 or 180 degree turn.

Figure 5:
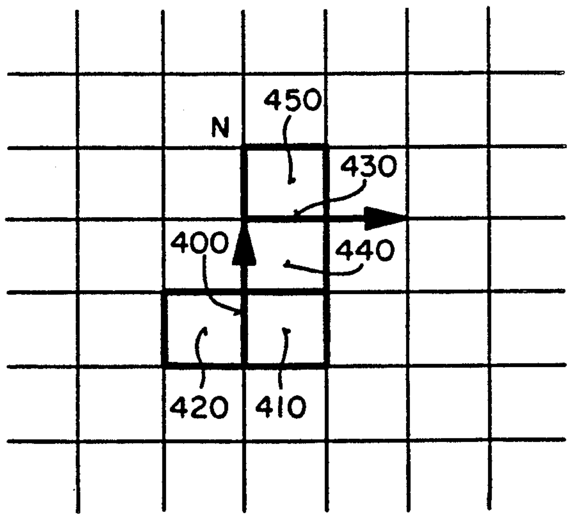
FIG. 5 illustrates target pixels and opposite pixels with respect to rook moves.

Once the strength of the rook move is determined, the rook move strength is compared to the target pixel for the rook move. The target pixel is defined to be the pixel in the winding direction (i.e., to the right or left) of the rook move. Preferably, the winding direction is the clockwise direction and therefore the target pixel is to the right of the rook move. Although the target pixel can be either the pixel to the right or left of the rook move, it must consistently be identified through out the entire character. Correspondingly, the opposite pixel is the pixel which is directly opposite the target pixel. For example, in the preferred embodiment, the opposite pixel would be the pixel to the left of the rook move from the perspective of the direction of the rook move. This is best illustrated by FIG. 5 which shows a rook move 400 having a target pixel 410 and opposite pixel 420. Similarly, rook move 430 has a target pixel 440 and opposite pixel 450.

At block 315 the strength of the rook move is compared to the target pixel value and opposite pixel value. If the rook move strength is greater than the target pixel value and is greater than the opposite pixel value, then at block 320 the target pixel value is set to equal the strength of the rook move and the opposite pixel value is set to equal zero the process then continues with the next rook move in the contour. If the rook move strength is not greater than the target pixel value and the opposite pixel value, then no further steps are taken and at block 335 a repeat of the process is initiated for the next rook move beginning at block 310. Once all the rook moves have been evaluated at block 350, the pixel values greater than zero are set to the binary value 1. The pixel values of 1's and 0's representing the bit map image of the character generated by the preceding steps is logically ORed with the bit map image of the character generated using a standard fill process such as the one described in the background of the invention.

Figure 2:
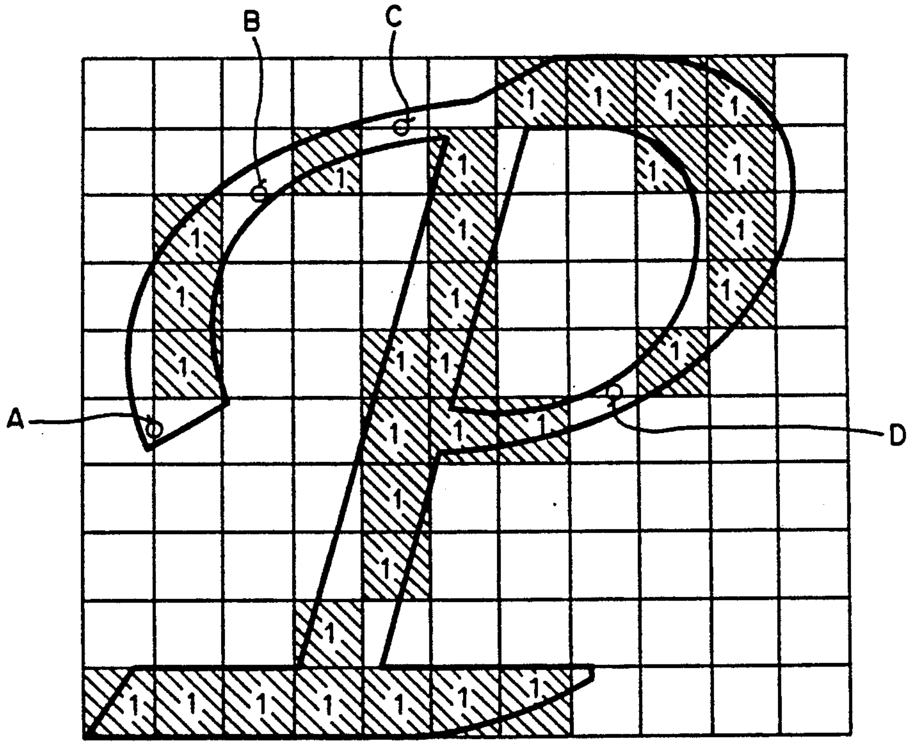
FIG. 2 illustrates the bit map generated and drop out which occurs with the letter "P" illustrated in FIGS. 1*a* and 1*b*.
Figure 7:
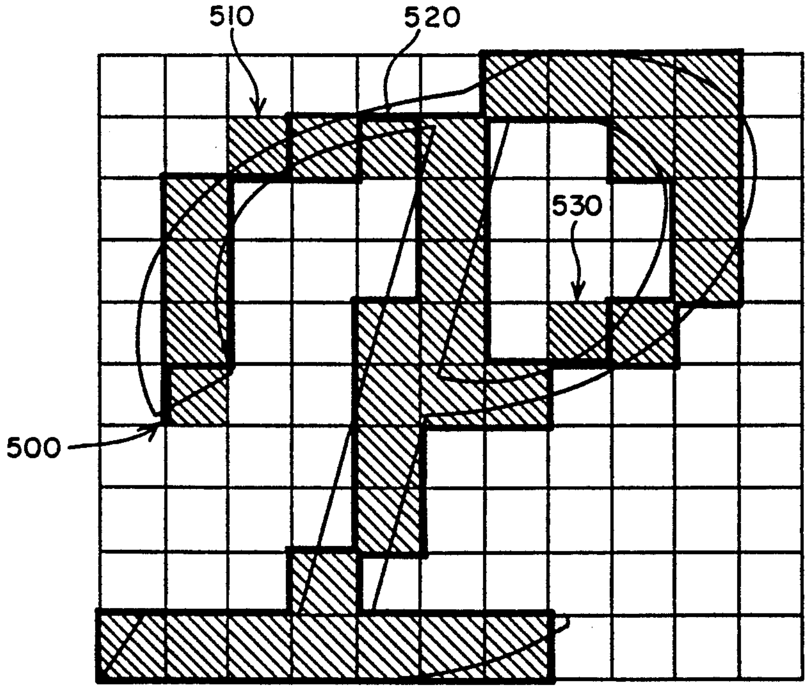
FIG. 7 illustrates representation of the letter "P" utilizing the preferred embodiment of the present invention.

FIG. 6 illustrates the values generated for the character "P". The values greater than zero are translated to a value of one and logically ORed with the bit map image depicted in FIG. 2 to generate the filled character depicted in FIG. 7 with the dropout which occurred at 500, 510, 520 and 530 eliminated.

While this invention has been described in conjunction with a preferred embodiment it is evident that numerous alternatives, modifications and variations and uses will be apparent to those skilled in the art in light of the foregoing description.

We claim:

1. A computer-implemented method for filling in outlines of characters in digital typefaces, each character outline having one or more contours, each contour having a direction, said method comprising the steps of:
   - breaking down the contours of the characters into a series of rook moves according to the direction of the contour, each rook move having a target and opposite pixel associated with it which are adjacent to the rook move;
   - generating a first bit map of the character by setting those pixels between rook moves to equal a value of one;
   - generating a second bit map of the character comprising the steps of:
     - initializing the pixels of the bit map to zero;
     - determining the strength of each rook move, the strength of a rook move corresponding to the total number of rook moves in a colinear sequence;
     - if the strength of the rook move is greater than the target pixel value and the strength of the rook move is greater than the opposite pixel value;
     - setting the target pixel value to equal the strength of the rook move;
     - setting the opposite pixel value to equal zero; and
     - translating the pixel values having a value greater than zero to a value of one thereby providing a second bit map of the character; and
   - performing a logical OR of the first and second bit maps of the character whereby the resulting bit map is the filled character.

2. The method of claim 1 wherein the step of generating a first bit map of the character comprises the steps of:
   - evaluating a character scan line by scan line starting at a first pixel in a scan line and continuing to an end pixel of the scan line;
   - setting pixels to a value of one which are subsequent to a first rook move which crosses the scan line;
   - setting pixels to a value of zero subsequent to a second rook move which crosses the scan line;
   - setting subsequent pixels to a value of one if subsequent first rook moves cross the scan line; and
   - setting subsequent pixels to a value of zero if subsequent second rook moves cross the scan line.

3. The method of claim 1 wherein the steps of determining the strength of the rook moves and setting the target and opposite pixels are sequentially determined around the outline of the character.

4. A computer-implemented method for eliminating the drop out which occurs in filled outlines of characters in digital typefaces, each character outline having one or more contours, each contour having a direction, the filled outlines depicted by a first bit mapped image of the character said method comprising the steps of:
   - breaking down the contours of the characters into a series of rook moves according to the direction of the contour, each rook move having a target and opposite pixel associated with it which are adjacent to the rook move and have an initial value of zero;
   - determining the strength of each rook move, the strength of a rook move corresponding to the total number of rook moves in a colinear sequence;
   - if the strength of the rook move is greater than the target pixel value and the strength of the rook move is greater than the opposite pixel value;
     - setting the target pixel value to equal the strength of the rook move; and
     - setting the opposite pixel value to equal zero;
   - adding those pixel values generated which are greater than zero to the first bit mapped image whereby the drop out is eliminated.

5. The method of claim 4 wherein the step of adding pixel values greater than zero to the first bit mapped image comprises the steps of:
   - translating the pixel values having a value greater than zero to a value of one thereby providing a second bit map of the character;
   - performing a logical OR of the first and second bit maps of the character whereby the resulting bit map is the filled character with the drop out eliminated.

6. The method of claim 4 wherein the steps of determining the strength of the rook moves and setting the target and opposite pixels are sequentially determined around the outline of the character.

7. A computer-implemented method for eliminating the drop out which occurs in filled outlines of characters in digital typefaces, each character outline having one or more contours, each contour having a direction, the filled outlines depicted by a first bit mapped image of the character, said method comprising the steps of:
   - breaking down the contours of the characters into a series of rook moves according to the direction of the contour, each rook move having a target and opposite pixel associated with it which are adjacent to the rook move and have an initial value of zero;
   - setting to a value of one those target pixels which are associated with rook moves having a strong visual effect on a viewer of the character and setting the corresponding opposite pixels to zero, said strong visual effect of the rook moves being related to the number of rook moves in a colinear sequence wherein the larger the number of rook moves in a colinear sequence, the stronger the visual effect;

adding those pixel values set to a value of one to the first bit mapped image whereby the drop out is eliminated.

8. The method of claim 7 wherein the step of setting to a value of one those target pixels which are associated with rook moves having a strong visual effect on a viewer of a character comprises the steps of:

determining the strength of each rook move, the strength of a rook move corresponding to the total number of rook moves in a colinear sequence;

if the strength of the rook move is greater than the target pixel value and the strength of the rook move is greater than the opposite pixel value;

setting the target pixel value to equal the strength of the rook move; and setting the opposite pixel value to equal zero;

translating the pixel values having a value greater than zero to a value of one thereby providing a second bit map of the character;

performing a logical OR of the first and second bit maps of the character whereby the resulting bit map is the filled character with the drop out eliminated.

9. The method of claim 7 wherein the steps of determining the strength of the rook moves and setting the target and opposite pixels are sequentially determined around the outline of the character.

10. An apparatus for filling in outlines of characters in digital typefaces, each character outline having one or more contours, each contour having a direction, said method comprising:

means for breaking down the contours of the characters into a series of rook moves according to the direction of the contour, each rook move having a target and opposite pixel associated with it which are adjacent to the rook move;

means for generating a first bit map of the character by setting those pixels between rook moves to equal a value of one;

means for generating a second bit map of the character comprising:

means for initializing the pixels of the bit map to zero;

means for determining the strength of each rook move, the strength of a rook move corresponding to the total number of rook moves in a colinear sequence;

if the strength of the rook move is greater than the target pixel value and the strength of the rook move is greater than the opposite pixel value;

means for setting the target pixel value to equal the strength of the rook move;

means for setting the opposite pixel value to equal zero; and means for translating the pixel values having a value greater than zero to a value of one thereby providing a second bit map of the character; and means for performing a logical OR of the first and second bit maps of the character whereby the resulting bit map is the filled character.

11. The apparatus of claim 10 wherein the means for generating a first bit map of the character comprises:

means for evaluating a character scan line by scan line starting at a first pixel in a scan line and continuing to an end pixel of the scan line;

means for setting pixels to a value of one which are subsequent to a first rook move which crosses the scan line;

means for setting pixels to a value of zero subsequent to a second rook move which crosses the scan line;

means for setting subsequent pixels to a value of one of subsequent first rook moves cross the scan line; and means for setting subsequent pixels to a value of zero if subsequent second rook moves cross the scan line.

12. The apparatus of claim 10 wherein the means for determining the strength of the rook moves and setting the target and opposite pixels sequentially determine around the outline of the character.

13. An apparatus for eliminating the drop out which occurs in filled outlines of characters in digital typefaces, each character outline having one or more contours, each contour having a direction, the filled outlines depicted by a first bit mapped image of the character said means comprising:

means for breaking down the contours of the characters into a series of rook moves according to the direction of the contour, each rook move having a target and opposite pixel associated with it which are adjacent to the rook move and have initial values of zero;

means for determining the strength of each rook move, the strength of a rook move corresponding to the total number of rook moves in a colinear sequence;

if the strength of the rook move is greater than the target pixel value and the strength of the rook move is greater than the opposite pixel value;

means for setting the target pixel value to equal the strength of the rook move; and means for setting the opposite pixel value to equal zero;

means for adding those pixel values generated which are greater than zero to the first bit mapped image whereby the drop out is eliminated.

14. The apparatus of claim 13 wherein the means for adding pixel values greater than zero to the first bit mapped image comprises:

means for translating the pixel values having a value greater than zero to a value of one thereby providing a second bit map of the character;

means for performing a logical OR of the first and second bit maps of the character whereby the resulting bit map is the filled character with the drop out eliminated.

15. The apparatus of claim 13 wherein the means for determining the strength of the rook moves and setting the target and opposite pixels sequentially determine around the outline of the character.

16. An apparatus for eliminating the drop out which occurs in filled outlines of characters in digital typefaces, each character outline having one or more contours, each contour having a direction, the filled outlines depicted by a first bit mapped image of the character, said apparatus comprising:

means for breaking down the contours of the characters into a series of rook moves according to the direction of the contour, each rook move having a target and opposite pixel associated with it which are adjacent to the rook move and have an initial values of zero;

means for setting to a value of one those target pixels which are associated with rook moves having a strong visual effect on a viewer of the character and setting the corresponding opposite pixels to zero, said strong visual effect of the rook moves being related to the number of rook moves in a colinear sequence wherein the larger the number of rook moves in a colinear sequence, the stronger the visual effect;

adding those pixel values set to a value of one to the first bit mapped image whereby the drop out is eliminated.

17. The apparatus of claim 16 wherein the means for setting to a value of one those target pixels which are associated with rook moves having a strong visual effect on a viewer of a character comprising:

means for determining the strength of each rook move, the strength of a rook move corresponding to the total number of rook moves in a colinear sequence;

if the strength of the rook move is greater than the target pixel value and the strength of the rook move is greater than the opposite pixel value;

means for setting the target pixel value to equal the strength of the rook move; and means for setting the opposite pixel value to equal zero;

means for translating the pixel values having a value greater than zero to a value of one thereby providing a second bit map of the character;

means for performing a logical OR of the first and second bit maps of the character whereby the resulting bit map is the filled character with the drop out eliminated.

18. The method of claim 16 wherein the means for determining the strength of the rook moves and setting the target and opposite pixels sequentially determine around the outline of the character.

* * * * *